No. 709,526. Patented Sept. 23, 1902.
F. W. TAYLOR & S. NEWBOLD.
METAL CUTTING TOOL HOLDER.
(Application filed Nov. 24, 1900.)
(No Model.) 3 Sheets—Sheet 2.
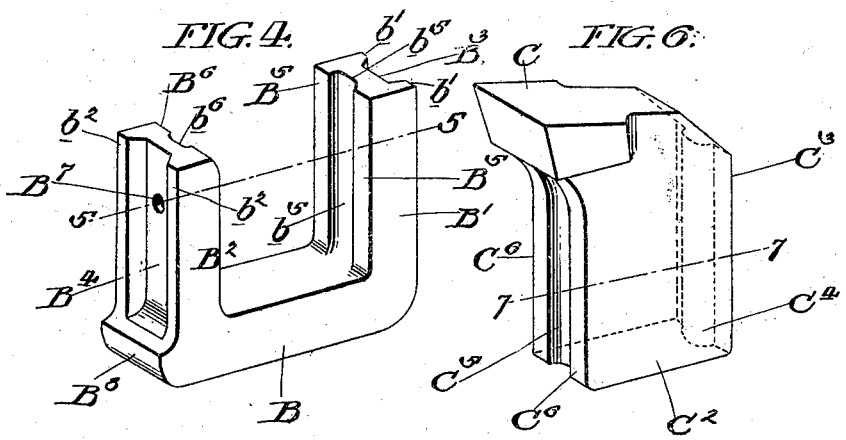
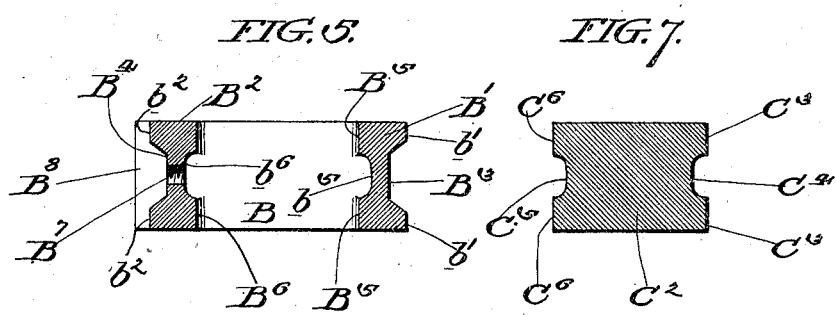
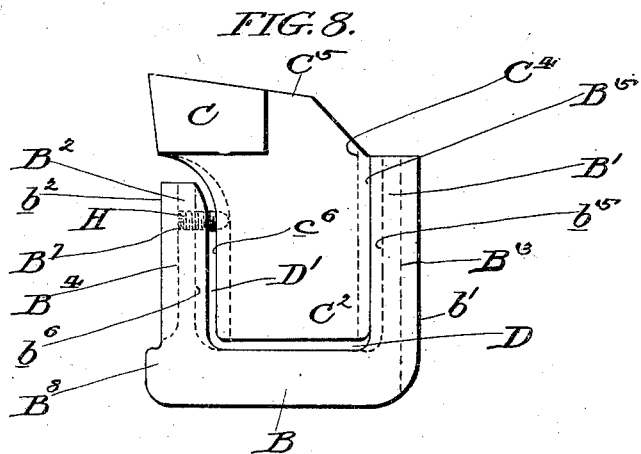

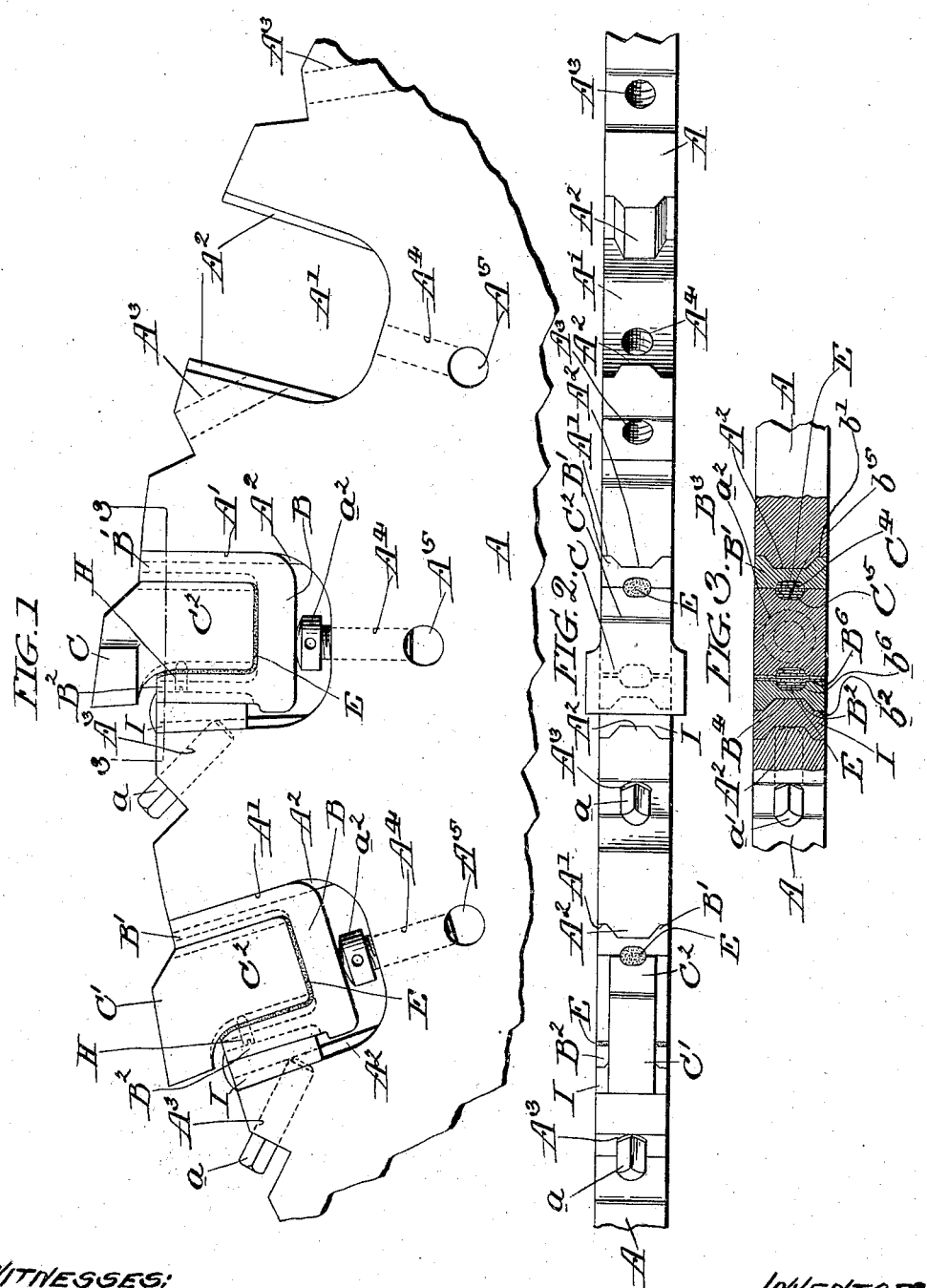

No. 709,526. Patented Sept. 23, 1902.
F. W. TAYLOR & S. NEWBOLD.
METAL CUTTING TOOL HOLDER.
(Application filed Nov. 24, 1900.)
(No Model.) 3 Sheets—Sheet 3.
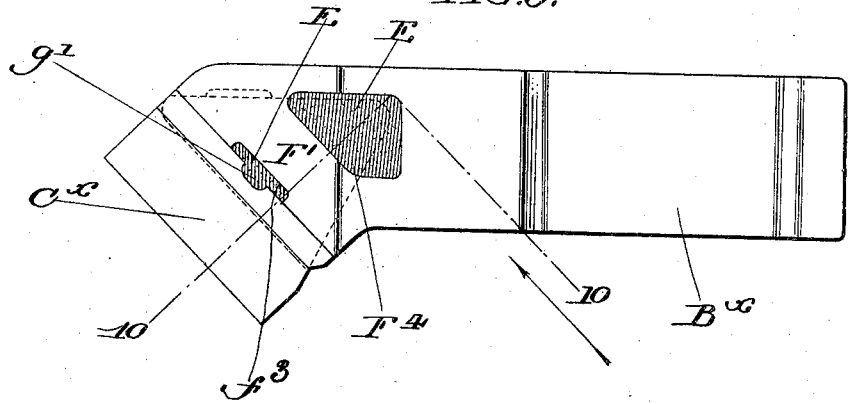
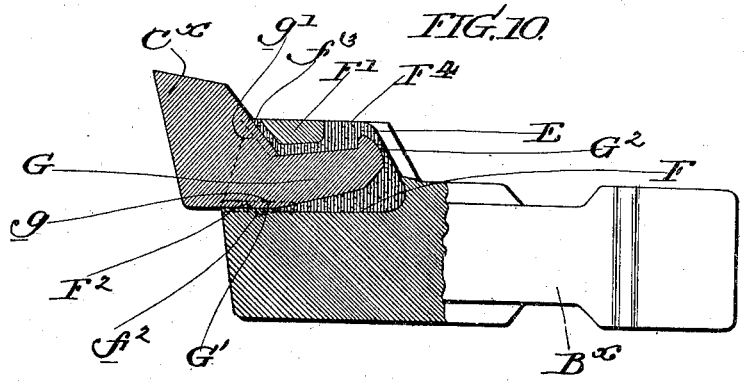
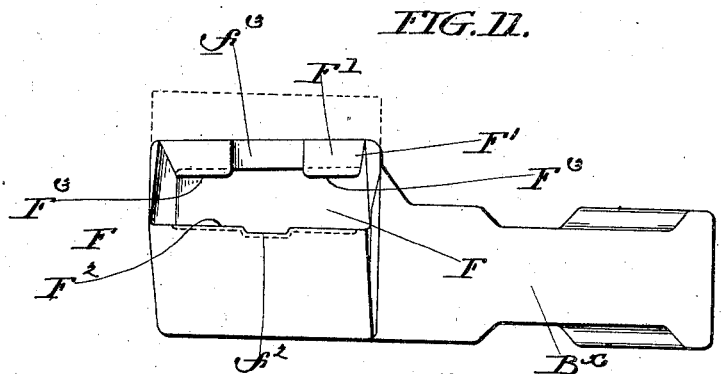
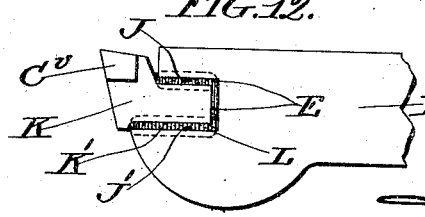
WITNESSES:
INVENTORS:

UNITED STATES PATENT OFFICE.

FREDERICK W. TAYLOR, OF SOUTH BETHLEHEM, AND SIDNEY NEWBOLD, OF BETHLEHEM, PENNSYLVANIA.

METAL-CUTTING-TOOL HOLDER.

SPECIFICATION forming part of Letters Patent No. 709,526, dated September 23, 1902.

Application filed November 24, 1900. Serial No. 37,583. (No model.)

*To all whom it may concern:*

Be it known that we, FREDERICK W. TAYLOR, residing at South Bethlehem, and SIDNEY NEWBOLD, residing at Bethlehem, in the county of Northampton and State of Pennsylvania, citizens of the United States of America, have invented a certain new and useful Improvement in Metal-Cutting-Tool Holders, of which the following is a true and exact description, reference being had to the accompanying drawings, which form a part thereof.

Our invention relates to a device for securing metal-cutting tools in holders, which holders in turn are adapted to be secured to appropriate parts of the machines which actuate the cutters.

The object of our invention is to provide a mode of constructing the tools and holders and of securing them together which while securing the tool with great force and efficiency will be cheap, permitting not only the convenient and rapid insertion and removal of the tool from the holder, but also permitting the use of tools and holders the engaged parts of which need not be fitted together except, preferably, at one point.

Our invention also enables us to securely hold a tool by a shank smaller than has heretofore been necessary, and in consequence we have more freedom in designing our toolholders and can in many cases make them stronger than where the tool is held in place by mechanisms which require certain spaces to be formed in the holders to receive them and are also expensive in that they require close and accurate fitting. Moreover, our device holds the tool with greater security than any fitted holding device and at the same time greatly lessens the destruction incident to a tool drawing out while at work.

Further objects and advantages of our construction will be best pointed out in connection with the drawings in which it is illustrated.

Broadly speaking, our invention consists in providing a tool-holder, preferably of strong nickel steel, having in it an opening or cavity to receive a metal-cutting tool and combining with such holder the tool proper, having a shank or portion inserted in the cavity and preferably directly abutted against the wall thereof which receives the main thrust of the tool in working, the tool being held and secured in the holder by a packing of fusible metal run into the spaces between the tool and holder in a fused condition and permitted to solidify therein. By preference and for the best results we use for the packing metal one having the property of contracting very little while cooling or preferably even expanding slightly while solidifying, such as type metal or spelter. By preference also we carefully fit together the abutting faces of the tool and that part of the cavity against which the tool directly abuts, so that an even strong abutment is formed between the two parts. It is necessary in heavy work that the faces of the tool and holder which are pressed together with the greatest force by the working pressure should be directly abutted, as above described, or supported in some equivalent manner—as, for instance, by interposing between said faces a hard metal—such as cast-iron, brass, or bronze—which virtually forms a part or face of the holder against which the tool abuts. This modification is of some value, as such hard metal may be poured between the tool and holder proper when molten and obviates the necessity of fitting the tool on its abutted face.

Our present application has especial reference to the above-described preferred construction; but the broad invention of anchoring metal-cutting tools in holders by means of fusible metal is covered in our other application, filed February 11, 1901, Serial No. 46,780.

It is proper to note that while our invention may be used with advantage in connection with carbon-tool steels it is peculiarly adapted for use in connection with air-hardening tool-steels, as the danger of impairing temper does not exist with the latter steels.

Other novel features of our construction will be described in connection with the drawings, in which—

Figure 1 is a side elevation of a portion of a saw-blade equipped with tools and holders. Fig. 2 is a plan view of the portion of the saw-blade and attachments shown in Fig. 1. Fig. 3 is a cross-sectional view on the section-line 3 3 of Fig. 1. Fig. 4 is a perspective view of the holder as shown in Figs. 1, 2, and 3; Fig. 5, a cross-sectional view of the holder on the line 5 5 of Fig. 4. Fig. 6 is a perspective view of the tool; Fig. 7, a cross-sectional view of the tool on the line 7 7 of Fig. 6. Fig. 8 is a side elevation of the tool and holder assembled but not yet packed with the metal packing. Fig. 9 is a plan view of a modified form of cutter and holder; Fig. 10, a cross-sectional view on the line 10 10 of Fig. 9; Fig. 11, a face view of the holder with the tool removed; and Fig. 12 is a side elevation of a modified form of holder, showing also a modification in the device for holding the tool therein.

Referring first to the construction shown in Figs. 1 to 8, inclusive, A indicates the saw-blade, which is a disk of steel or iron formed with a series of peripheral cavities, (indicated at A' A', &c.,) the opposite walls of which are preferably ribbed, as indicated at $A^2$ $A^2$, $A^3$ indicating a threaded perforation in which a set-screw (indicated at $a$) works. $A^4$ is a threaded perforation formed in the saw-blade at the bottom of the cavities A and extending to a transverse perforation $A^5$, an adjusting-screw (indicated at $a^2$) working in this perforation. B is the tool-holder especially designed for use in connection with saw-blades and similar tool-driving apparatus, the holder being of U-shape, B' and $B^2$ indicating the upright arms of the U, $b'$ and $b^2$ the outer faces of these arms, and $B^3$ and $B^4$ grooves formed in these outer faces to fit on the ribs $A^2$ $A^3$ of the saw-blade cavity. $B^5$ and $B^6$ indicate the opposite walls of the arms B' and $B^2$, and, by preference, the wall $B^5$ is smooth-finished, the other walls of the tool being left, by preference, rough. $b^5$ and $b^6$ indicate grooves formed in the walls $B^5$ and $B^6$. $B^7$ is a threaded perforation extending through the arm $B^2$, and $B^8$ a slight projection at the lower part of the outer wall of the arm $B^2$, which, however, may be omitted without material effect. C and C' are the metal-cutting tools, the cutting edge of the tool C being broader than that of the tool C'. Each of these tools is formed integral with a shank $C^2$, adapted to enter the cavity or opening between the arms B' and $B^2$ of the holder. The back wall $C^3$ of the shank is preferably smooth-finished, so as to fit neatly against the back wall $B^5$ of the holder, the other portions of the tool being left rough-finish, as it is neither necessary or desirable that they should come in contact with the holder. The front wall of the tool-shank is indicated at $C^6$, and, by preference, both this wall and the wall $C^3$ are grooved, as indicated at $C^4$ and $C^5$. H (see Fig. 8) is a set-screw working in the threaded perforation $B^7$ and having the function of holding the cutter in place in the holder prior to the insertion of the metal packing. Any device for clamping the shank of the tool against the back wall $B^5$ of the holder may be used in place of set-screw H, which, indeed, though a preferred is not a necessary part of our construction. The tool is secured in the holder as indicated in Fig. 8, spaces, as indicated at D and D', separating the shank of the tool and the walls of the holder, and these spaces and also the grooves in the inner walls of the holder and in the walls of the tool-shank are then filled by some fusible metal in a molten condition, preferably one which expands in solidifying, and this metal being allowed to cool and solidify fills all the spaces between the tool and holder, as indicated at E, Figs. 1, 2, and 3, the union between the tool and holder being stronger, as well as less expensive and less throublesome, than can readily be obtained by a wedging fit between the parts and the relatively soft metal of the packing being amply strong to stand the strains to which it is subjected, the main thrust of the tool against the holder being taken up where said tool directly abuts against the metal of the holder. The tool is not only readily inserted in the holder, but is also readily removed therefrom by melting out the fusible packing, so that a new tool can be inserted or an old tool reset and adjusted whenever desired. The holders B are placed in cavities A', their bottom walls fitting against the grooved bottom wall of the cavity, while between their top walls and the top wall of the cavity in the blade is inserted a wedge, as indicated at I, this wedge conforming to the shape of the walls of the holder and cavity and being driven down with force, so as to tightly wedge the holder in the cavity of the saw-blade, the wedge being further held in position by the set-screw $a$.

A peculiar advantage of the new-shaped tool-holder described is that its upright arms are readily adjustable to and from each other by the bending of the material, so that they can always be made to occupy the position best fitted for a tight wedging fit in the cavity of the saw-blade.

Referring now to the modification illustrated in Figs. 9, 10, and 11 and which modification in its special features where it differs from that shown in the former figures is made the subject-matter of a separate application for Letters Pattent, filed February 11, 1901, Serial No. 46,781, $B^x$ indicates the holder, which is formed with a cavity (indicated at F) to receive the shank of the tool F, F' being a bridge-like portion of the holder extending over the top of the cavity, $F^2$ indicating a smooth-finish back wall to the cavity, $F^3$ the opening in the cavity through which the tool-shank is inserted, and $F^4$ an opening in the cavity on the opposite side of the bridge F', which is especially left for the purpose of permitting the tamping of the metal packing. $f^2$ and $f^3$ indicate grooves formed in the smooth-finish wall $F^2$ and in the front of the bridge-wall F'. $C^x$ indicates the metal-cutting tool, G indicating the shank of the tool, which is inserted in the cavity F of the holder. The back wall of the tool is smooth-finished, so as to abut firmly against the back wall F² of the holder, and the extreme end of the tool-shank is preferably provided with an upwardly-extending angle, as indicated at G². The tool is inserted in the holder as indicated in Figs. 9 and 10 and the fusible metal then poured in, filling the spaces between the holder and tool-shank, as indicated at E and in the same way as already described in connection with the first construction illustrated. The opening F⁴ permits tamping-tools to compact and press the metal packing in spaces lying between the tool shank and holder, and, as in the other construction described, the tool is firmly held in position, while being very readily inserted and as easily removed from the holder. In this form of construction the advantage of a small consumption of tool-steel, together with increased strength in the tool and holder, is more manifest than in the first construction; but in both constructions there is the common advantage that in case the tool should by any unusual strains be torn from the holder the crushing of the holder is a comparatively minor ill in comparison with the loss and expense incident to the tearing of a tool from a saw-blade or other permanent part of the cutting-machine.

In Fig. 12 we have shown our invention in a simple form as applied to a parting-tool, (indicated at C$^v$,) B$^v$ being the holder, having a cavity J in the form of a transverse slot across the end of the holder, J' indicating the bottom wall of the cavity against which the thrust of the tool comes. K indicates the portion of the tool inserted in the cavity J, and K' the bottom face of said inserted portion, which, as shown, does not abut directly against the bottom of the cavity, but against a hard-metal facing L, poured while fused between said faces J' and K', E indicating the packing of fusible metal poured, as in other modifications, in the spaces between the tool and cavity.

We wish it to be clearly understood that where in the claims we refer to the abutment of the tool against a wall of the holder-cavity we include such a modification as that illustrated in Fig. 12, where said cavity-wall has a hard-metal facing. (Shown at L in said figure.)

Having now described our invention, what we claim as new, and desire to secure by Letters Patent, is—

1. A tool-holder having a cavity to receive a portion of a metal-cutting tool in combination with a metal-cutting tool having a portion inserted in said cavity and abutted against the wall thereof which receives the main thrust in working, and a packing of metal more easily fused than the metals of the tool and holder said metal being, in a fused condition, run into the spaces left between the walls of the cavity and the inserted portion of the tool and allowed to cool and solidify in said spaces to hold the tool in position.

2. A tool-holder having a cavity to receive a portion of a metal-cutting tool in combination with a metal-cutting tool having a portion inserted in said cavity and abutted against the wall thereof which receives the main thrust in working, said holder-cavity and inserted tool portion having one or more grooves, as $b^5$ C⁴, formed therein, and a packing of metal more easily fusible than the metals of the tool and holder said metal being, in a fused condition, run into the spaces left between the walls and grooves of the cavity and the inserted portion of the tool and allowed to cool and solidify in said spaces to hold the tool in position.

3. A tool-holder having a cavity to receive a portion of a metal-cutting tool and said cavity having its wall which receives the main thrust in working smooth-finished, in combination with a metal-cutting tool having a portion inserted in said cavity the bottom side of said portion being smooth-finished on one face and directly abutted against the smooth-finished wall of the holder-cavity and a packing of metal more easily fusible than the metal of the holder and tool said metal being, while fused, run into the spaces left between the tool and the walls of the cavity in the holder and allowed to cool therein.

4. A tool-holder having a cavity to receive a portion of a metal-cutting tool in combination with a metal-cutting tool having a portion inserted in said cavity and abutted against the wall thereof which receives the main thrust in working, and a packing of metal more easily fused than the metals of the tool and holder and having the property of expanding in becoming solid, said metal being, in a fused condition, run into the spaces left between the walls of the cavity and the inserted portion of the tool and allowed to cool and solidify in said spaces to hold the tool in position.

5. A tool-holder having a cavity to receive a portion of a metal-cutting tool in combination with a metal-cutting tool having a portion inserted in said cavity and abutted against the wall thereof which receives the main thrust in working, said holder-cavity and tool portion having one or more grooves, as $b^5$ C⁴, formed therein and a packing of metal more easily fused than the metals of the tool and holder and having the property of expanding in becoming solid, said metal being, in a fused condition, run into the spaces left between the walls and grooves of the cavity and the tool and allowed to cool and solidify in said spaces to hold the tool in position.

6. A tool-holder having a cavity to receive a portion of a metal-cutting tool and said cavity having its wall which receives the main thrust in working smooth-finished, in combination with a metal-cutting tool having a portion inserted in said cavity, the bottom side of said portion being smooth-finished and directly abutted against the smooth-finished wall of the holder-cavity and a packing of metal more easily fused than the metal of the holder and tool and having the property of expanding on becoming solid, said metal being, while fused, run into the spaces left between the tool and the walls of the cavity in the holder and allowed to cool therein.

7. A tool-holder having a cavity to receive a portion of a metal-cutting tool in combination with a metal-cutting tool having a portion inserted in said cavity and abutted against the wall thereof which receives the main thrust in working, a device for holding the tool in proper position in the holder independently of the metal packing, and a packing of metal more easily fused than the metals of the tool and holder, said metal being in a fused condition, run into the spaces left between the walls of the cavity and the tool and allowed to cool and solidify in said spaces to hold the tool in position.

8. A U-shaped tool-holder in combination with a metal-cutting tool having a portion set in the space between the arms of the holder and abutted against the arm in the direction of which the tool is thrust in working and a packing of metal more easily fused than the metals of the tool and holder which metal is run into the spaces between the tool and holder while fused and allowed to cool and solidify in said spaces.

9. A U-shaped tool-holder having grooves $b^5$ $b^6$ in its arms in combination with a metal-cutting tool having a grooved portion set in the space between the arms of the holder and abutted against the arm in the direction of which the tool is thrust in working and a packing of metal more easily fused than the metal of the holder and tool which metal is run into the spaces and grooves between the tool and holder while fused and allowed to cool and solidify in said spaces.

FREDERICK W. TAYLOR.
SIDNEY NEWBOLD.

Witnesses:
JAMES HENNESY,
DAVID C. FENNER.